Figure 1:
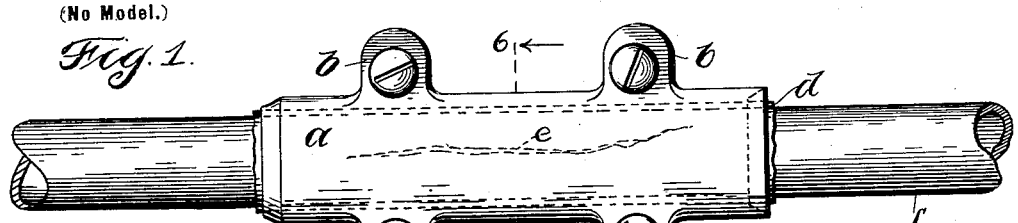

No. 633,607. Patented Sept. 26, 1899.
I. J. O'MALLEY.
REPAIR CLAMP FOR PIPES.
(Application filed June 12, 1899.)
(No Model.)

Witnesses:

Inventor:
Ira J. O'Malley
By Charles A. Brown & Cragg
Attorneys.

UNITED STATES PATENT OFFICE.

IRA J. O'MALLEY, OF CHICAGO, ILLINOIS.

REPAIR-CLAMP FOR PIPES.

SPECIFICATION forming part of Letters Patent No. 633,607, dated September 26, 1899.

Application filed June 12, 1899. Serial No. 720,198. (No model.)

*To all whom it may concern:*

Be it known that I, IRA J. O'MALLEY, a citizen of the United States, residing at Chicago, in the county of Cook and State of Illinois, have invented a certain new and useful Improvement in Repair-Clamps for Pipes, (Case No. 1,) of which the following is a full, clear, concise, and exact description, reference being had to the accompanying drawings, forming a part of this specification.

My invention relates to repair-clamps for repairing breaks and closing seams in pipes, and has for its object the provision of an improved form of clamp of this class which is adapted more effectively to seal the openings in the pipes than those heretofore employed.

It is the object of my invention to provide an improved repair-clamp wherein the pressure exerted by the clamp about the seam or fracture is more evenly distributed.

To this end my invention comprises in its preferred embodiment two half-sleeves, each half-sleeve having at or near each of its ends fastening means which enable the half-sleeves to be clamped tightly about the pipe. I preferably employ a packing-strip, of rubber or similar material, which may be interposed between the half-sleeve and that portion of the pipe containing the fracture, this packing-strip being firmly and evenly compressed about the fracture through the agency of the fastening devices at or near the ends of the half-sleeves.

As is well known, the opening formed by the bursting of a lead pipe is comparatively short, though more than one opening may be forced in the bursting. In the latter case the openings usually occur upon opposite sides of the pipe. By means of my device I am readily enabled to seal both openings, the packing-strips in the case last supposed being placed upon opposite sides or otherwise disposed with relation to each other to seal the openings. I preferably engage the half sleeve or sleeves that are not opposed to any fractured openings directly with the pipe.

Where fractures occur in iron pipes owing to abnormal pressure, they usually follow the seams, in which case the openings created in the pipe are frequently longer than those occurring in lead pipe, in which event I preferably employ a longer strip of packing material interposed between the pipe and the clamp. In order that openings of various lengths may be readily sealed, I preferably form the clamps in sections of uniform length and so shape the ends of the half-sleeves that the sections may be united to form clamps of suitable length. By forming the clamps of assembled sections I also am enabled to secure more evenly distributed clamping pressure where a long opening is to be sealed.

The fastening devices that I preferably employ for uniting the opposed members or half-sleeves of the clamp are comprised of lugs projecting from the half-sleeves and screws passing through bores in the said lugs.

I will explain my invention more particularly by reference to the accompanying drawings, illustrating the preferred embodiment thereof, in which—

Figure 2:
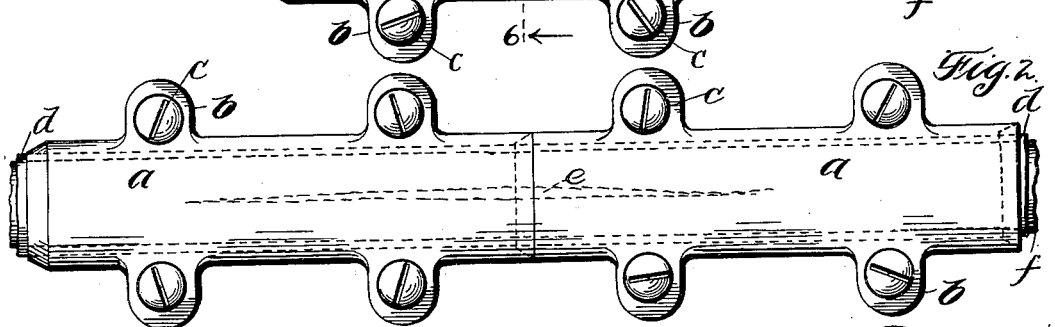
Figure 3:
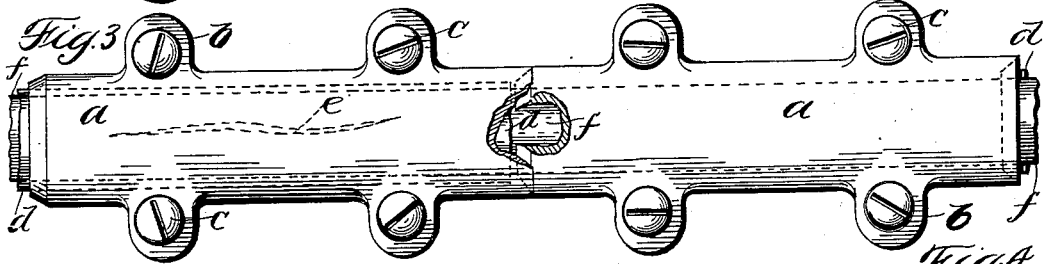
Figure 4:
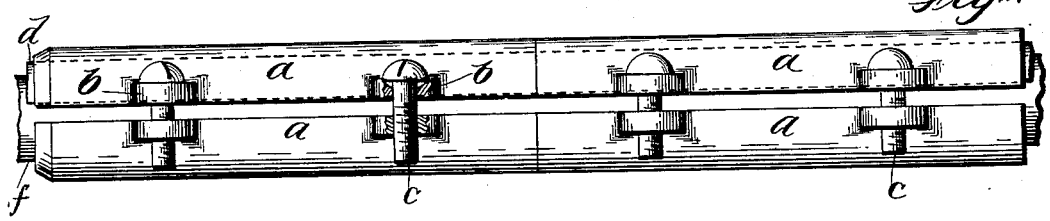
Figure 5:
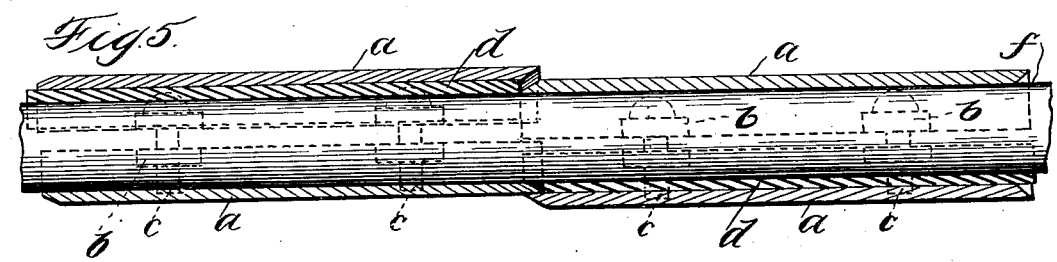
Figure 6:
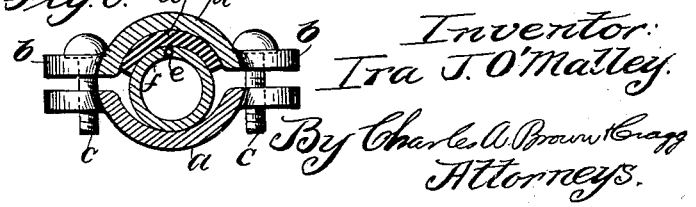

Figure 1 is a plan view of a clamp constructed in accordance with the invention in place about the pipe. Fig. 2 is a plan view of a clamp formed of assembled sections in place about the pipe to seal a long opening therein. Fig. 3 is a plan view of a clamp formed of assembled sections in place about a pipe for sealing openings upon opposite sides of the pipe. Fig. 4 is a side elevation of the clamp shown in Fig. 2. Fig. 5 is an axial sectional view of the clamp shown in Fig. 3, the pipe being shown in full elevation. Fig. 6 is a cross-sectional view on line 6 6 of Fig. 1.

Like parts are indicated by similar letters of reference throughout the different figures.

The clamp or each clamp-section comprises two elongated half-sleeves *a a*. Two laterally-extending ears or lugs *b b* are provided at or near each end of the half-sleeves, as shown, to afford sufficient space longitudinally between the lugs to secure the application of uniform pressure, as by the employment of but a single fastening device for clamping the half-sleeves in place the free ends of the sleeves would be likely to recede from the pipe, and thereby permit the flow of gas or liquid from the pipe. Each half-sleeve is thus provided at its ends with two laterally-extending ears, the half-sleeves in being assembled being so relatively arranged that the laterally-projecting ears upon one half-sleeve oppose the corresponding ears upon the other half-sleeve. The ears are provided with holes through which threaded screws, preferably machine-screws, *c c* are passed, the holes in the ears engaging the heads of the screws being preferably smooth, while those through which the lower ends of the screw-stems pass are threaded to engage the same. In repairing a leak or opening in a pipe I preferably interpose a packing-strip *d*, made, preferably, of rubber, between that portion of the pipe which is broken and a half-sleeve. As indicated, the fastening devices *b c* are provided upon opposite sides of the half-sleeves, the fastening devices upon each side of the clamp being longitudinally separated.

Where the fracture is short, as is usually the case where lead pipe is burst, a clamp formed of but two opposed half-sleeves is sufficient. In Fig. 1 I have indicated an opening *e* in the pipe *f* by dotted lines. In Fig. 2 I have illustrated an opening *e* such as may occur in iron pipe, which is liable to separate along a seam in bursting. In this instance the opening in the iron pipe is longer than could be repaired by a clamp formed of but two opposed sleeves, in which event I form a clamp in suitably-assembled sections, the packing *d* being interposed between the contiguous half-sleeves *a a* upon the same side of the pipe and the opening in the pipe.

In order that clamps may be formed of a length suited to the size of the fracture in the pipe, I preferably chamfer or taper the outer portion of one end of each of the half-sleeves and the inner wall or bore at the other end, as indicated most clearly in Figs. 2 and 5, so that the clamps may be elongated and neatly assembled, and whereby the pressure exerted by the clamping-screws upon each side of the joint between the sections may be equalized.

In Figs. 3 and 5 I have shown a clamp formed of assembled sections as employed in sealing short openings upon opposite sides of a pipe. In this case a packing-strip *d* is interposed between a half-sleeve and one side of the pipe and a second packing-strip between another half-sleeve and the other side of the pipe to seal these short openings.

I preferably so construct the half-sleeves that they may be suited for pipes of sizes which vary within small limits.

While I have shown and particularly described the precise form of joint constructed in accordance with the invention and as comprising two separate half-sleeves, I do not wish to be limited to the precise details of construction; but,

Having thus described my invention, I claim as new and desire to secure by Letters Patent—

1. In a repair-clamp for pipes, the combination with half-sleeves *a a*, each provided with two laterally-extending and longitudinally-separated ears *b b* at one longitudinal edge upon one side of the clamp, the said clamp being also provided with laterally-extending ears upon the other side thereof, of screws *c c* passing through ears upon the clamp into engagement with opposed ears upon the clamp when the sleeves are assembled about a pipe that is to be repaired, substantially as described.

2. In a repair-clamp for pipes, the combination with half-sleeves *a a*, each provided with four laterally-extending ears *b b*, two ears being located at each longitudinal edge of each sleeve and being longitudinally separated, of screws *c c* passing through the ears upon one half-sleeve and adapted to have engagement with the ears upon the other half-sleeve when the said sleeves are assembled about a pipe that is to be repaired, substantially as described.

3. In a repair-clamp for pipes, the combination with half-sleeves *a a*, each provided with four laterally-extending ears *b b*, two ears being located at each longitudinal edge of each sleeve and being longitudinally separated, of screws *c c* passing through the ears upon one half-sleeve and adapted to have threaded engagement with the ears upon the other half-sleeve when the said sleeves are assembled about a pipe that is to be repaired, and a packing-strip *d* adapted to be interposed between one of said sleeves and the pipe, substantially as described.

4. In a repair-clamp for pipes, the combination with a plurality of half-sleeves, each having the outer portion of one end tapered and the bore at the other end tapered to enable the half-sleeves to be securely assembled, of longitudinally-separated fastening devices provided in connection with each half-sleeve, whereby the said sleeves may be fastened in place about a pipe that is to be repaired, substantially as described.

5. In a repair-clamp for pipes, the combination with a plurality of half-sleeves, each having the outer portion of one end tapered and the bore at the other end tapered to enable the half-sleeves to be securely assembled of longitudinally-separated fastening devices provided in connection with each half-sleeve, whereby the said sleeves may be fastened in place about a pipe that is to be repaired, and packing material *d* adapted to be interposed between the said sleeves and the pipe, substantially as described.

6. In a repair-clamp for pipes, the combination with a plurality of half-sleeves, each having the outer portion of one end tapered and the bore at the other end tapered to enable the half-sleeves to be securely assembled, of four ears provided in connection with each half-sleeve, two ears being located along each longitudinal edge of each half-sleeve, and fastening-screws adapted for engagement with the said ears to fasten the half-sleeves in place about the pipe, substantially as described.

7. In a repair-clamp for pipes, the combination with a plurality of half-sleeves, each having the outer portion of one end tapered and the bore at the other end tapered to enable the half-sleeves to be securely assembled, of four ears provided in connection with each half-sleeve, two ears being located along each longitudinal edge of each half-sleeve, fastening-screws adapted for engagement with the said ears to fasten the half-sleeves in place about the pipe, and packing material $d$ adapted to be interposed between the said sleeves and the pipe, substantially as described.

In witness whereof I hereunto subscribe my name this 8th day of June, A. D. 1899.

IRA J. O'MALLEY.

Witnesses:
GEORGE L. CRAGG,
CHARLES E. HUBERT.